Oct. 8, 1957 R. U. LEMIEUX 2,809,205
PRODUCTION OF USTILIC ACIDS
Filed April 9, 1952
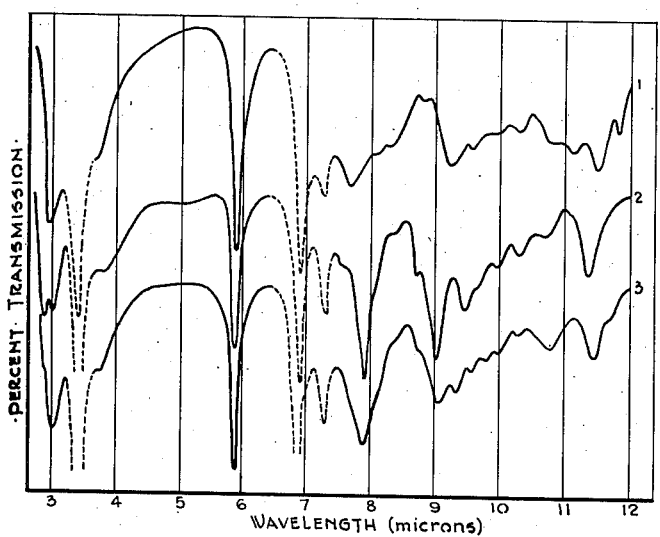
1. Ustilic acid (15,16-dihydroxyhexadecanoic acid)
2. Ustilic acid (2,15,16-trihydroxyhexadecanoic acid)
3. Ustilic acid mixture.
------ Hydrocarbon oil absorption bands.
Fig-1-
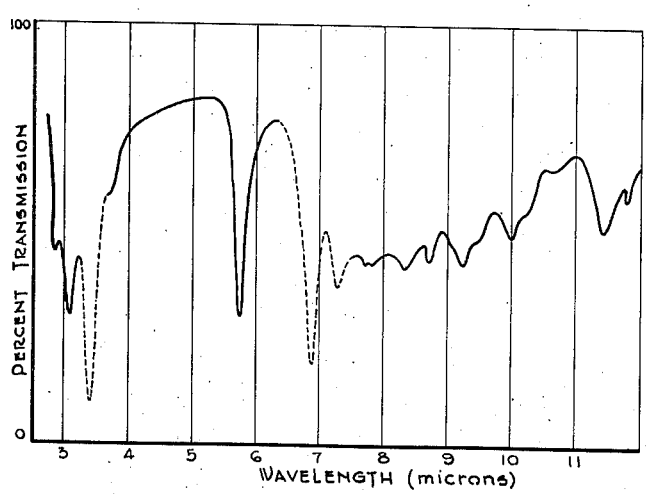
Infrared spectrum of Methyl Ustilate mixture
---- Hydrocarbon oil absorption bands
Fig-2-
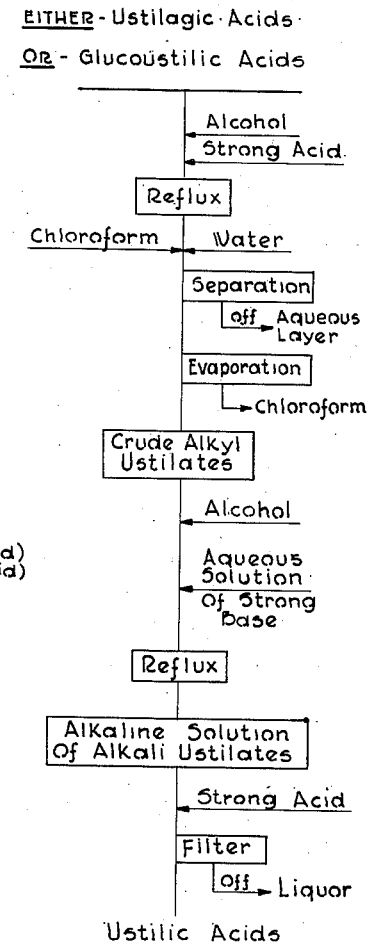
Fig-3-
INVENTOR.
Raymond U. Lemieux
BY
Attorney.

United States Patent Office 2,809,205
Patented Oct. 8, 1957

2,809,205
PRODUCTION OF USTILIC ACIDS

Raymond U. Lemieux, Saskatoon, Saskatchewan, Canada, assignor to National Research Council, Ottawa, Ontario, Canada, a body corporate of Canada Application April 9, 1952, Serial No. 281,451

7 Claims. (Cl. 260—406)

This invention relates to the production of ustilic acids, their esters and salts.

Ustilagic acid has been produced by growing an aseptically-aerated submerged culture (No. NRRL 2321 and No. ATC 11,427) of the organism *Ustilago zeae* in an aqueous medium having a pH between 4 and 7 and containing a soluble carbohydrate, a source of assimilable nitrogen and essential mineral salts at temperatures of 24° to 34° C. as disclosed in application S. N. 277,177 now Patent No. 2,698,843. Glucoustilic acids are prepared from ustilagic acid or from the above culture mixture as disclosed in application Serial No. 281,454 filed of even date herewith now Patent No. 2,701,794.

The object of the present invention is to produce the ustilic acids, 15,16-dihydroxyhexadecanoic and 2,15,16-trihydroxyhexadecanoic, their esters and salts, from ustilagic acids or glucoustilic acids produced therefrom. There products are particularly useful in the synthesis of macrocyclic musks highly valuable in the perfume industry.

The ustilagic acid is solubilized and saponified by the addition of alkali. Upon acidification glucoustilic acids are precipitated and removed. Upon treatment with an alcoholic solution of a strong acid the glucose residues are removed to yield a mixture of alkyl ustilates which may be purified by crystallization or hydrolyzed to ustilic acids.

Hydrochloric, sulphuric or toluenesulphonic acid are used in the lower alkyl alcohols and sodium, potassium and barium hydroxide in the hydrolysis.

When the glucoustilic acids are treated with methanol, ethanol or butanol in the presence of a strong acid, esters of two ustilic acids are formed, namely (a) 15,16-dihydroxyhexadecanoic and (b) 2,15,16-trihydroxyhexadecanoic. The former has the formula:

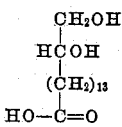

and is optically active $[\alpha]_D -8°$ in methanol and has an M. P. 112–113° C., and the latter has the formula:

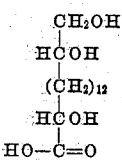

and is optically active $[\alpha]_D -10°$ in methanol and has an M. P. 140–141° C.

The infra-red spectra of each of the ustilic acids and of the mixture are shown in Figure 1 of the accompanying drawing and the infrared spectrum of the methyl ustilate mixture is shown in Figure 2.

The wave lengths of the absorption maxima characteristic of ustilic acid 15,16-dihydroxyhexadecanoic expressed in microns are: 11.83, 11.53, 11.15, 10.31, 9.25, 8.83, 8.32, 8.11, 7.68, 5.86 and 2.94.

The wave lengths of the absorption maxima characteristic of ustilic acid 2,15,16-trihydroxyhexadecanoic expressed in microns are: 11.40, 10.77, 10.30, 9.97, 9.44, 9.00, 8.40, 7.92, 5.86, 3.80, 2.96 and 2.84.

The wave lengths of the absorption maxima characteristic of the ustilic acid mixture expressed in microns are: 11.47, 10.81, 10.32, 10.00, 9.80, 9.48, 9.33, 9.04, 7.87, 5.84, 3.70 and 2.97.

The wave lengths of the absorption maxima characteristic of the methyl ustilate mixture expressed in microns are: 1181, 11.47, 10.01, 9.23, 8.73, 8.31, 7.80, 7.70, 5.77, 3.06 and 2.84.

An illustrative flow sheet is given in Figure 3 of the drawing and the following examples are given:

(1) A solution of the ustilagic acids, 13.8 grams in 280 ml. of 4.3% methanolic hydrogen chloride, was refluxed for 19 hours. The solution was poured into water and the resulting aqueous mixture was extracted with chloroform. The chloroform extract was reduced by evaporation to a yellow oil which was then dissolved in 100 ml. of ethanol and 40 ml. of 2 N sodium hydroxide added. The solution was refluxed for two hours and poured into 500 ml. of 0.2 N hydrochloric acid. The precipitate formed was collected, washed with water and dried. The yield of ustilic acid mixture, neutral equivalent 296±4, was nearly quantitative, 5.1 grams, M. P. 124–127° C.

(2) A mixture of the ustilagic acids, 5.0 grams, and 50 ml. of methanol containing 2.5 ml. of concentrated sulphuric acid was refluxed for seven hours. The resulting cloudy mixture was poured into 50 ml. of chloroform and 100 ml. of water was added. After shaking, the bottom chloroform layer was withdrawn and washed free of sulphuric acid with water. The chloroform was removed by evaporation to yield a crystalline solid which was dissolved in 5 ml. of chloroform. On adding 10 ml. of petroleum ether and cooling, 1.1 grams of crude methyl ustilate mixture was precipitated.

(3) A solution of ustilagic acid, 5.0 grams, in 50 ml. of methanol and 5.0 grams of toluenesulphonic acid was refluxed for six hours. The solution was poured into water and the aqueous mixture was extracted with chloroform. After washing the chloroform extract with water, it was reduced to crystalline residue which was dissolved in 5 ml. of chloroform. On adding 10 ml. of petroleum ether, and cooling, 1.7 grams of crude methyl ustilate mixture was deposited in crystalline condition.

(4) One neutral equivalent of ustilagic acid was dissolved in an aqueous solution which contained 3.5 equivalents of sodium hydroxide and the mixture was refluxed for about fifteen minutes. The resulting clear solution was poured into water which contained more than 3.5 equivalents of strong mineral acid. The highly swollen precipitate which formed was glucoustilic acid.

20.0 gms. of the glucoustilic acid mixture in 250 ml. of 5% hydrogen chloride in methanol was heated under reflux for nineteen hours. The reaction mixture was poured into water and the resulting mixture extracted with chloroform. The chloroform extract was concentrated to a yellow oil which crystallized at room temperature. The yield was 9.8 grams of the methyl ustilate mixture, M. P. 79–81° C. These esters were hydrolyzed to the ustilic acid mixture as follows. The mixture of esters, 9.8 gm., were dissolved in 200 ml. of ethanol and 20 ml. of 2 N sodium hydroxide added. The solution was refluxed for two hours and poured into 500 ml. of 0.1 N hydrochloric acid. The precipitate formed was collected, washed with water and dried. The yield of ustilic acid mixtures, neutral equivalent, 296±4 was nearly quantitative, 9.2 grams, M. P. 124–127° C.

(5) Ustilagic acid, 15.0 gms., was suspended in 150 ml. of dry ethanol and 7.5 gm. of hydrogen chloride gas was bubbled in. The ustilagic acid soon dissolved and the solution was refluxed for four hours. Chloroform, 50 ml., was added and the resulting mixture was poured into 250 ml. of water. After shaking, the chloroform layer was removed and washed with water until the water remained neutral. The resulting chloroform solution was filtered and evaporated to about 25 ml. volume. Petroleum ether, 50 ml., was added and on standing at 4° C. the solution deposited about 4.9 gm. of crystalline material, M. P. 61–62.5° C., with sintering at 57° C., which was a mixture of the ethyl ustilates. The esters are dissolved in 25 ml. of ethanol and 20 ml. of N aqueous sodium hydroxide solution was added. The resulting mixture was refluxed for one half hour and poured into 200 ml. of 0.105 N hydrochloric acid. The precipitate which formed was collected by filtration, washed with water until free of chloride and recrystallized from 25 ml. of ethanol to yield about 4.1 gm. of ustilic acid mixture, M. P. 127–131° C.

(6) Glucoustilic acid, 12.0 gm., was suspended in 100 ml. of dry butanol and 5 gm. of hydrogen chloride was dissolved into the mixture. On shaking the warm solution, the glucoustilic acid soon dissolved. The solution was heated on the steam bath for two hours, poured into water and the upper butanol layer was washed free of the mineral acid using water. The resulting butanol solution was evaporated in vacuo to an oil which crystallized at room temperature. The material was dissolved in 30 ml. of ethanol and 20 ml. of N aqueous sodium hydroxide was added. After refluxing for one half hour, the solution was poured into 200 ml. of 0.105 N aqueous sulphuric acid and the precipitate which formed was recovered by filtration and washed with water until free of sulphate. The filter cake was pressed as dry as possible and dissolved in 30 ml. of boiling ethanol. On cooling, about 4.9 grams of the ustilic acid mixture, M. P. 126–130° C. crystallized out of the solution.

(7) A solution of 1 lb. of $KH_2PO_4$, 0.4 lb.

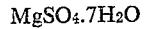

0.03 lb. $FeSO_4.7H_2O$, 0.6 lb. corn steep liquor and 55 lb. of cerelose (glucose monohydrate) in 85 gallons of water was sterilized by autoclaving in a 250 gallon fermentor equipped with a foam breaker. To the cooled solution, a sterile solution of 1.2 lb. urea in 5 gallons of water and a sterile slurry of 1.7 lbs. $CaCO_3$ in 5 gallons of water was added aseptically. The resulting mixture was inoculated with 5 gallons of *Ustilago zeae* culture and stirred at 30° C. for 4 days at 200 R. P. M. while passing sterile air through the media at a rate of 4–5 cu. ft. per minute. The growth of the fungus was vigorous with the medium becoming creamy in colour and consistency. After 4 days, the free glucose content had dropped to near total consumption. The fermentation mixture was made strongly alkaline by the addition of 2 lbs. of sodium hydroxide. After stirring for two hours at 30° C., the resulting mixture was freed of residual culture solids by centrifugation. The clear centrifugate was made acid to Congo red by the addition of sulphur acid. After standing for one day at room temperature there was deposited a precipitate. The precipitate was gathered by centrifugation to yield wet glucoustilic acids. This substance either is dried to yield crude glucoustilic acid mixture or is dissolved in aqueous alkali to yield an aqueous solution of sodium glucoustilate from which sodium glucoustilate is readily obtained as white powder by spray drying. The wet glucoustilic acid is best dried in a forced draft oven at about 50° C. to yield a darkcoloured brittle mass which is readily ground to powder. The yield of either crude glucoustilic acid or sodium glucoustilate from such 100 gallons fermentations varied within the limits 3 to 4 lbs. The crude glucoustilic acid, 100 grams, in 1000 ml. of 4.2% methanolic hydrogen chloride was refluxed for eight hours. The solution was filtered to remove some residual solids, poured into water and extracted with chloroform. The chloroform extract was reduced by evaporation to about 200 ml. volume and, after cooling, 200 ml. of "Skellysolve C" (petroleum ether solvent) was added. On cooling overnight at 4° C., there was deposited 29.1 gm. of methyl ustilate mixture, M. P. 77–79° C. The sodium glucoustilate, 5 gm., in 50 ml. of 5% methanolic hydrogen chloride was refluxed for ten hours. The solution was filtered, poured into water and extracted with chloroform. Removal of the chloroform by evaporation yielded crude methyl ustilate mixture which was recrystallized from 5 ml. chloroform with the addition of petroleum ether to turbidity to yield 2.2 grams of material, M. P. 76–78° C.

The ustilic acids found in the mixtures as produced can be separated in a variety of ways. A convenient method is an extractive procedure based on the fact that while 15,16-dihydroxyhexadecanoic yields an acidic monoisopropylidene derivative, 2,15,16-trihydroxyhexadecanoic yields a neutral diisopropylidene derivative.

Treatment of a ustilic acid mixture with acetone and sulphuric acid gives a quantitative yield of the isopropylidene derivatives. On treating the mixture of isopropylidene derivatives with diazomethane a mixture of esters is obtained, the components of which are readily separated by fractional distillation at reduced pressures.

Another method for separation of ustilic acids is based on the fact that nickel salt of 2,15,16-trihydroxyhexadecanoic is much less soluble in aqueous alcohol than the corresponding salt of 15,16-dihydroxyhexadecanoic. Separation is therefore possible by fractional precipitation.

The following are examples illustrative of the separation of the ustilic acids.

(a) A ustilic acid mixture, 47.3 gm., was dissolved by shaking in 500 ml. of dry acetone which contained 5 ml. of concentrated sulphuric acid. The solution was allowed to stand at room temperature for five hours. After this time, the solution was diluted with 800 ml. of "Skellysolve C" and 800 ml. of an ice-water mixture was added. After shaking vigorously for thirty seconds, the layers were allowed to separate and the bottom aqueous layer was withdrawn and discarded. The "Skellysolve C" solution of the isopropylidene derivatives of the ustilic acids was washed three times with 200 ml. amounts of water in order to remove the sulphuric acid and as much as possible the acetone. A cold solution of 20 gm. of potassium hydroxide in 130 ml. of water was then added and the mixture was shaken vigorously for one minute. On the addition of 150 ml. of 50% aqueous ethanol, the emulsion broke and the bottom aqueous layer was separated. The "Skellysolve C" layer was washed twice more with 100 ml. amounts of the 50% ethanol and these extracts were combined with the main aqueous extract. The combined aqueous extracts were extracted with 200 ml. of "Skellysolve C" and this extract was combined with the main "Skellysolve C" solution.

Chloroform, 150 ml., was added to the combined aqueous layers and this mixture was acidified by the addition of 200 ml. of 2 N sulphuric acid. The chloroform layer was washed three times with 100 ml. volumes of water, dried over sodium sulphate and evaporated to dryness to yield a yellow oil which soon crystallized. The yield was 34.8 gm. This substance is the crude monoisopropylidene derivative of 15,16-dihydroxyhexadecanoic acid. The isopropylidene group can be hydrolyzed off to yield crude acid. The substance was dissolved in 150 ml. of dioxane and 15 ml. of N hydrochloric acid was added. The solution was boiled in an open flask for three minutes and water was added to turbidity. On cooling a crystalline precipitate formed which was gathered by filtration and washed with water. The partially dried material was dissolved in 50 ml. of boiling ethanol, the solution was treated with a gram of decolourizing charcoal, filtered and cooled. The melting point of the crystalline precipitate, 25.1 gm. 15,16-dihydroxyhexadecanoic acid was 114–115° C.

The above described "Skellysolve C" solution which contains the diisopropylidene derivative of 2,15,16-trihydroxyhexadecanoic acid was washed with 50 ml. amounts of water until neutral and dried over sodium sulphate. The solution was evaporated to an oil which crystallized at room temperature. The yield was 15.1 gm. After one recrystallization from 25 ml. of methanol, the material melted at 42–42.5° C. The pure diisopropylidene ustilate melts at 42.5–43.0° C. Hydrolysis of this compound yields 2,15,16-trihydroxyhexadecanoic acid. Thus, the diisopropylidene ustilate, 10.0 gm., was dissolved in 50 ml. of dioxane, 5 ml. of N hydrochloric acid was added and the solution was boiled for three minutes. Water was added to turbidity and on cooling 7.80 gm. of 2,15,16-trihydroxyhexadecanoic acid having an M. P. 137–139° C. crystallized.

(b) The ustilic acid mixture, 6.0 gm., is dissolved in 125 ml. of methanol and the solution is neutralized with N sodium hydroxide. Nickelous acetate, 1.0 gm., dissolved in 25 ml. of methanol is added to the solution. The precipitate which forms is collected by filtration and washed with methanol. The substance is essentially 2,15,16-trihydroxyhexadecanoic acid in the form of its nickel salt. This is shown by decomposition of the salt with a strong aqueous acid to yield a white material which after recrystallization from ethanol melted at 137–138° C. The filtrate from the isolation of the nickel ustilate is concentrated to about 25 ml. and this mixture is added to 100 ml. of water containing sufficient mineral acid to decompose the ustilic acid salt. The precipitated ustilic acid is collected by filtration, washed with water and recrystallized from ethanol. The material is 15,16-dihydroxyhexadecanoic acid having a melting point 113–117° C.

It will be observed that the melting point ranges given in the examples vary considerably and are dependent upon the degree of purification of the particular compound. As shown in the examples, the melting points of the mixtures of the ustilic acids are intermediate those of 15,16-dihydroxyhexadecanoic acid and 2,15,16-trihydroxyhexadecanoic acid.

The term "glucoustilic acids" as used herein means a mixture consisting essentially of two acids represented by the following structural formulae—

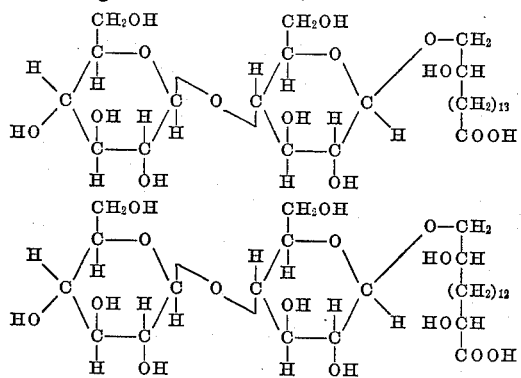

The term "ustilagic acids" as used herein means a mixture consisting essentially of two acids as indicated by the following approximate chemical structure. The precise structure has not been determined despite diligent effort to do so—

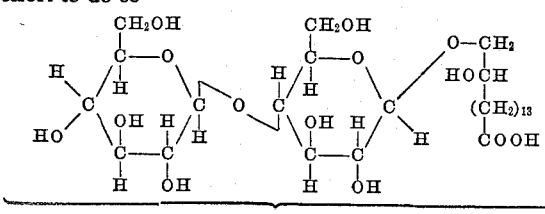

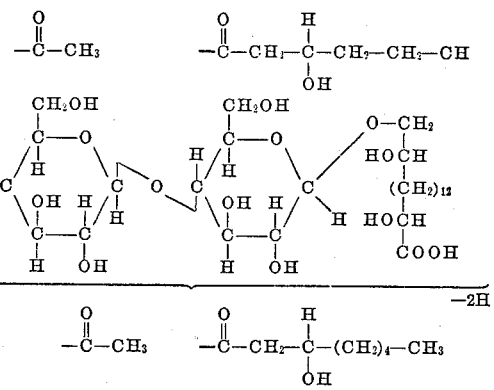

I claim:

1. A method of preparing ustilic acids, their esters and salts which comprises reacting at least one of a group of organic acids consisting of a mixture of ustilagic acids and a mixture of glucoustilic acids with a lower alkyl alcohol and a strong acid to form esters of ustilic acids and hydrolyzing the esters to form a mixture of ustilic acids.

2. In the preparation of the ustilic acids 15,16-dihydroxyhexadecanoic and 2,15,16-trihydroxyhexadecanoic, their esters and salts, the method which comprises reacting glucoustilic acids in a lower alkyl alcohol with a solution of a strong acid, maintaining the temperature of the mass between room temperature and 100° C. until the ustilic acid residues are split off and separating the esters of said ustilic acids so formed.

3. In the production of the ustilic acids 15,16-dihydroxyhexadecanoic and 2,15,16-trihydroxyhexadecanoic, their esters and salts, the method which comprises reacting ustilagic acids in a lower alkyl alcohol with a solution of a strong acid, maintaining the temperature of the mass between room temperature and 100° C. until ustilic acid residues are split off, adding water, extracting the mixture with an organic solvent, evaporating the extract, precipitating therefrom a mixture of the esters of said ustilic acids and hydrolyzing the latter to form the acids.

4. A mixture of the ustilic acids 15,16-dihydroxyhexadecanoic and 2,15,16-trihydroxyhexadecanoic which when suspended in a solid state in hydrocarbon oil exhibits characteristic absorptions in the infrared region of the spectrum at the following wave lengths expressed in microns, 11.47, 10.81, 10.32, 10.00, 9.80, 9.48, 9.33, 9.04, 7.87, 5.84, 3.70 and 2.97.

5. A mixture of methyl esters of ustilic acids 15,16-dihydroxyhexadecanoic and 2,15,16-trihydroxyhexadecanoic which when suspended in solid state in hydrocarbon oil exhibits characteristic absorptions in the infrared region of the spectrum at the following wave lengths expressed in microns, 11.81, 11.47, 10.01, 9.23, 8.73, 8.31, 7.80, 7.70, 5.77, 3.06 and 2.84.

6. The ustilic acid 15,16-dihydroxyhexadecanoic which when suspended in a solid state in hydrocarbon oil exhibits characteristic absorptions in the infrared region of the spectrum at the following wave lengths expressed in microns, 11.83, 11.53, 11.15, 10.31, 9.25, 8.83, 8.32, 8.11, 7.68, 5.86 and 2.94.

7. The ustilic acid 2,15,16-trihydroxyhexadecanoic which when suspended in a solid state in hydrocarbon oil exhibits characteristic absorptions in the infrared region of the spectrum at the following wave lengths expressed in microns, 11.40, 10.77, 10.30, 9.97, 9.44, 9.00, 8.40, 7.92, 5.86, 3.80, 2.96 and 2.84.

References Cited in the file of this patent

Schroder: Ann., 143, 37–8 (1867).
Markley: Fatty Acids, Interscience Pub. Inc., New York City, 1947, page 559.
Lemieux, Canadian J. of Chem., vol. 29 (May 1951), pages 415–425.